UNITED STATES PATENT OFFICE.

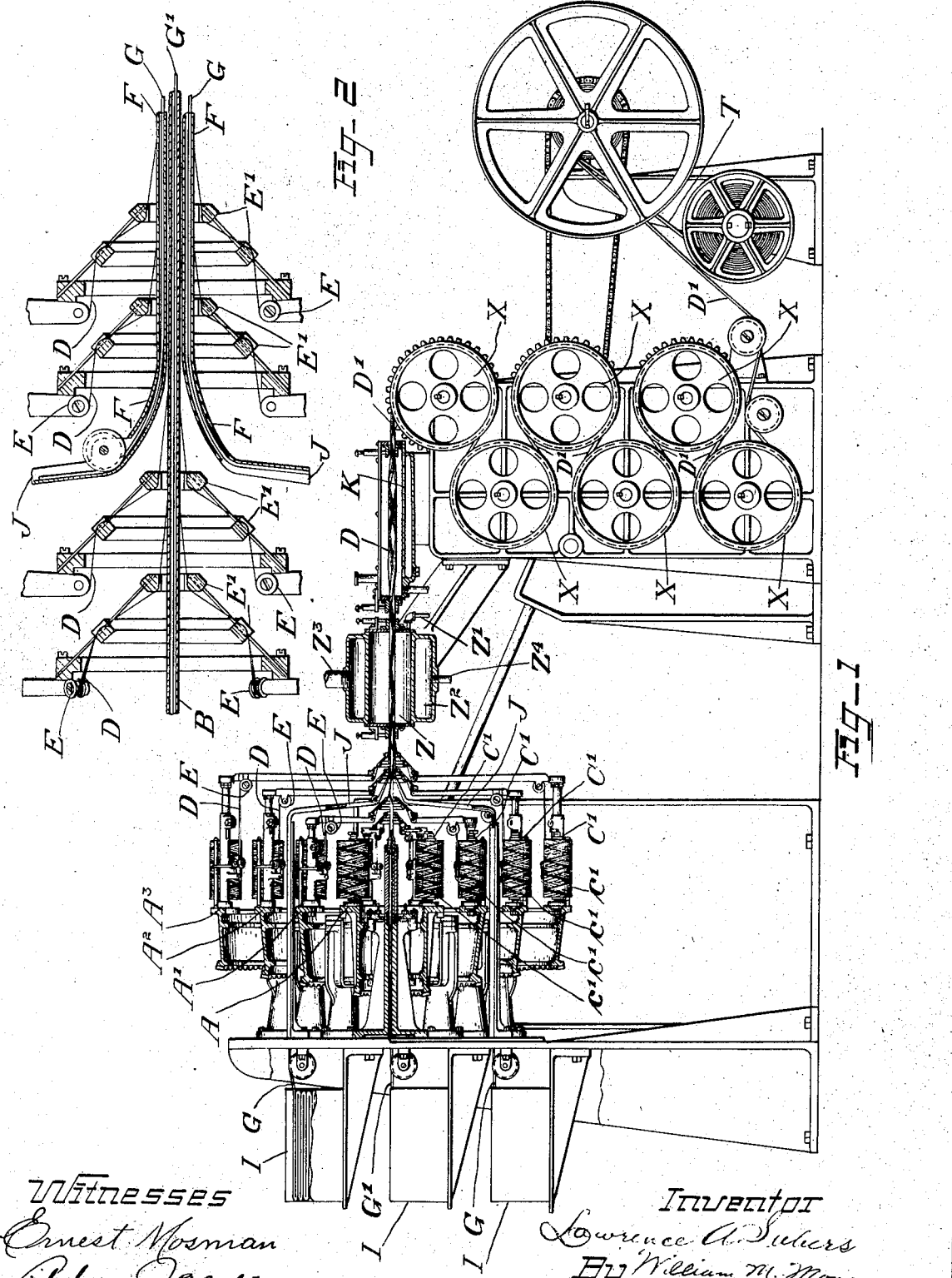

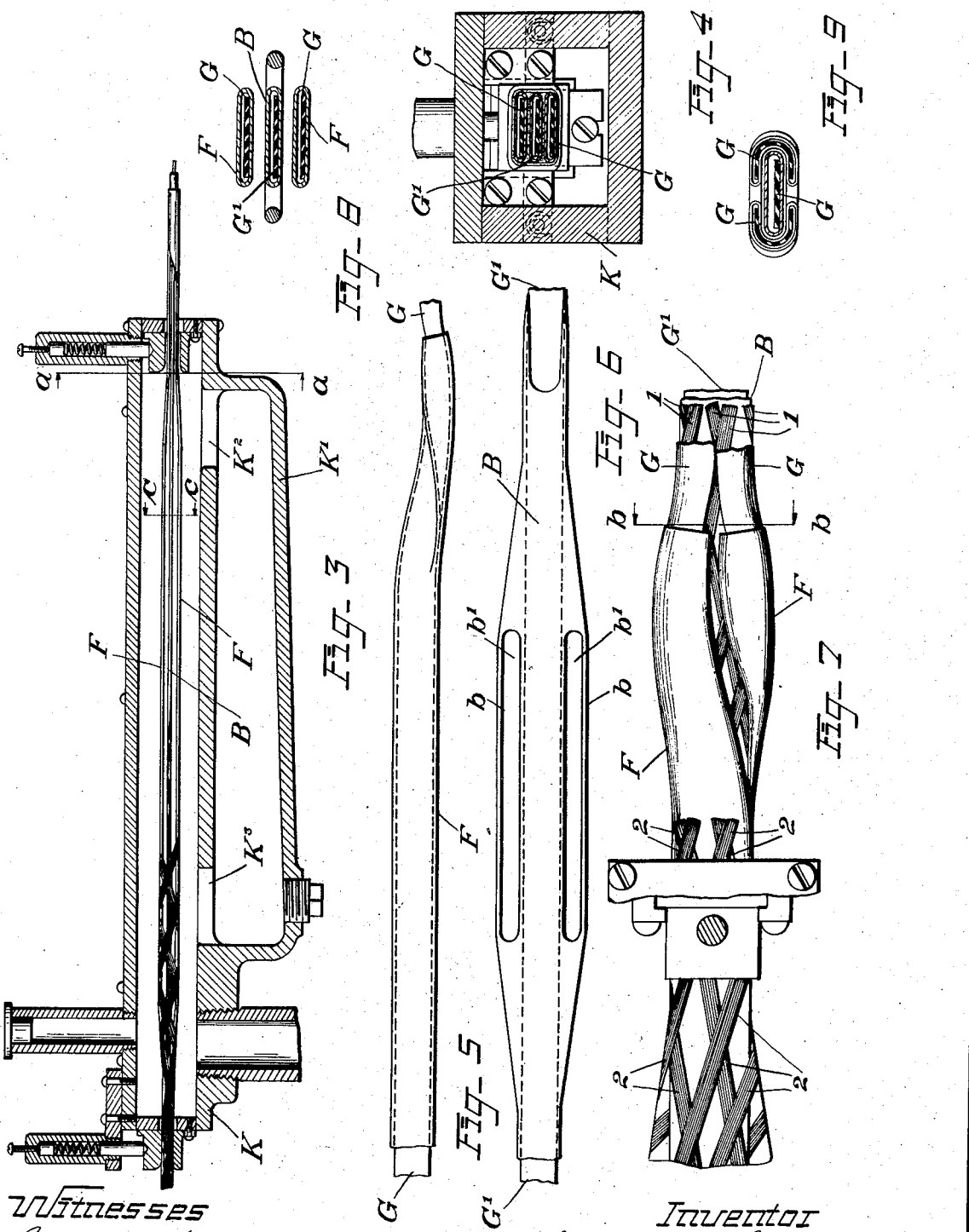

LAWRENCE A. SUBERS, OF EAST CLEVELAND, OHIO.

AUTOMATIC DEVICE FOR COATING AND COVERING FIBROUS ELEMENTS WITH A FLUID AND SOLID ADHESIVE.

1,192,017. Specification of Letters Patent. Patented July 25, 1916.

Application filed July 27, 1914. Serial No. 853,328.

*To all whom it may concern:*

Be it known that I, LAWRENCE A. SUBERS, a citizen of the United States, and resident of East Cleveland, in the county of Cuyahoga and State of Ohio, have invented certain new and useful Improvements in Automatic Devices for Coating and Covering Fibrous Elements with a Fluid and Solid Adhesive, of which I hereby declare the following to be a full, clear, and exact description, such as will enable others skilled in the art to which it appertains to make and use the same.

The objects of the invention are to provide mechanism for incorporating a layer or strips of solid rubber, or other adhesive, within the body of a laminated, flattened, tubular, fabric band such as is described in a copending application bearing Serial No. 850,147, and filed July 10, 1914. This band is composed of crossed series of parallel, spaced, flexible, fibrous elements, interwound upon a mandrel, and which are individually coated with fluid adhesive such as vulcanizable india rubber, in a coating chamber, and during the winding of these elements, bands of solid unvulcanized adhesive, such as india rubber, are interposed between the series, and the fabric band is finally removed from the mandrel in a tubular form and flattened to form a band having selvage edges. In the act of flattening the band, the layer or layers of solid adhesive in the opposite sides thereof cohere through the spaced openings and unite to form a homogeneous product in which all the fibers are incased in adhesive and are practically out of frictional contact with each other. Further, the band will have diamond shaped spaces of solid adhesive exposed upon its sides so that when a tubular, laminated, cohering, interwound fabric is formed therefrom the fabric will be bonded together and will be able to sustain great internal pressure with no danger of percolation of fluid therethrough, since the walls are substantially impervious.

The devices forming this invention are employed in a band making machine substantially similar to the one described in copending application for Letters Patent Serial No. 796,592, filed Oct. 22, 1913, in which a winding head and a tubular mandrel are employed and in which fluid adhesive is directly applied to each fiber of the fibrous elements that compose the band. These portions of the machine having been described in my previous applications need to be only briefly referred to herein to show the arrangement and association of the various parts.

The improvements consist in a group of preferably flattened tubular mandrels, arranged parallel to each other and closely adjoining each other, one of them being centrally located relative to the others, and through two or more of which are conducted strips or bands of unvulcanized, solid adhesive. The series of fibrous elements from the winding head are, some of them, wound on the central tubular mandrel, and other series of the fibrous elements are wound around the entire group of mandrels as a unit. The solid adhesives are separated from the liquid adhesive in the coating chamber by the inclosing mandrels while the fibrous elements are being coated with fluid adhesive, and they emerge from the outer extremities of the mandrels and are so positioned as to be immediately interposed between the groups or series of fibrous elements as the band is being pulled off from the mandrels. The solid adhesive in the central mandrel is encircled by series of fibrous elements and the outer strips of adhesive are also encircled by series of fibrous elements, and together with the fibrous elements are pulled off from the mandrels by a suitable pulling device.

The invention is hereinafter further described, illustrated in the accompanying drawings and specifically pointed out in the claims.

In the accompanying drawings Figure 1 is a vertical longitudinal section of the machine; Fig. 2 is a vertical longitudinal section, enlarged, of the mandrel, the rotatable guides which wind the fibrous elements upon the mandrel, and the guides, which do not rotate, for the solid rubber bands; Fig. 3 is a longitudinal central section of the inclosed coating chamber filled with liquid adhesive, when operating the machine, through which the mandrels pass and upon which the fibrous elements are separated to expose them to the liquid coating; Fig. 4 is a transverse section of the same on line *a—a* Fig. 3; Fig. 5 is an enlarged plan view of a portion of a tubular mandrel through which one of the rubber bands is fed to the band upon the central mandrel; Fig. 6 is an enlarged plan view of the portion of the central mandrel which is inclosed in the coating chamber; Fig. 7 is an enlarged plan view of the outer end of the central mandrel showing two tubular mandrels for applying solid adhesive bands to the fibrous elements upon the mandrel; Fig. 8 is a transverse section, enlarged, on line $c, c$, Fig. 3, of the mandrels where they are inclosed in the coating chamber; Fig. 9 is a similar section on line $b, b$ Fig. 7 after they emerge from the rubber chamber.

In these views the construction of the reels A, A', $A^2$ and $A^3$ which rotate about a hollow mandrel B, and are supplied with spindles C', C', C', C', upon which are mounted spools, $c'$, $c'$, $c'$, $c'$, upon which the yarn elements D, D, D, D, are stored, has been described in my co-pending applications. From these spools the yarn elements are guided to the mandrels by means of guide rollers E, E, E, E, and guide rings E', E', E', E' as shown in Figs. 1 and 2, and as the reels and guides rotate, are wound upon the mandrels in series of parallel rows, spaced apart to form diamond shaped openings as one series crosses the other. Four series comprise a fabric band of two layers or laminations, and each series is positioned upon the mandrel to cover the spaces of the parallel series below. After the first series and the second series, which crosses the first series at a predetermined angle, have been wound around the central hollow mandrel B, the third and fourth series of yarn elements are wound upon the outer mandrels which comprise flattened tubes F, F, and the central mandrel B as a unit. Bands G, G, of solid adhesive pass through the tubes F, F, which are positioned one upon each side of the central mandrel. This mandrel is also preferably hollow and flattened and a band of solid adhesive G', passes therethrough.

The bands of adhesive are preferably stored in suitable receptacles I, I, and are so coiled as to be readily drawn therefrom. They are preferably coated with a practically non-adhesive powder, which prevents the folds from cohering, and can be vulcanized into the adhesive afterward without any material injury to the adhesive. The outer bands of solid adhesive are led through guiding channels or tubes J, J, and these guides communicate with the flattened tubular mandrels F, F. The outer mandrels F, F, are positioned above and below the mandrel B within the coating chamber as shown in Figs. 3, 4, and 8, and outside of the outer extremity of the coating chamber K they are curved about the edges of the central mandrel as shown in Figs. 5, 7, and 9, so that the first two series of fibrous elements (1, 1, Fig. 7) are laid upon the inner band G' of adhesive, and the two outer series (2, 2, Fig. 7) are laid upon the outer bands G, G, of adhesive. The central mandrel is designed to separate the fibrous elements on all the mandrels as the elements pass through the coating chamber K, and to accomplish this result, the central mandrel is extended laterally at $b, b$, and openings $b', b'$, are made therein through which the liquid adhesive will flow so as to coat each fiber of the fibrous elements therewith, before the bands of adhesive are interposed among the fibrous elements, thus separating the fibrous elements from contact with each other and incorporating a large body of solid adhesive within the band.

An improvement is made in the coating chamber K to prevent the piling up of the adhesive at the forward end, and equalizing the pressure throughout the chamber. This comprises the false bottom K' providing a conduit communicating with the extremities of the chamber K at $K^2$, $K^3$, so that the adhesive will pass therethrough when the pressure becomes greater at the forward end of the chamber and will return to the other end.

The fibrous elements are coated in the coating chamber and the bands of solid adhesive are interposed therewith as the fibrous elements are drawn off from the mandrel by the pulling device. The fabric band D' is wound upon a spool S, upon which it is stored, and between the coils is interposed a band of non-adhesive material such as Holland cloth or non-adhesive metal ribbon T.

The pulling device is shown to comprise rollers X, X, X, which slightly and progressively increase in diameter, so as to place a slight tension upon the band to flatten and straighten the same.

To eliminate any undesirable moisture from the fibrous elements which might prevent perfect adhesion, a chamber Z is employed through which the elements pass as they are drawn along the mandrels and are therein subjected to a predetermined amount of either vacuum or heat, or both. This chamber is shown in section in Fig. 1 at Z. From this chamber leads an exhaust pipe Z' and annularly about the chamber is positioned a heating chamber $Z^2$ having inlet and drain pipes $Z^3$ and $Z^4$ respectively.

It is obvious that instead of incorporating two strips of solid adhesive in the fabric band, and employing two hollow guiding members therefor, one band of solid adhesive may be used which may be wide enough to form a single enveloping layer around the first series of fibrous elements wound upon the central mandrel and may be guided by a tubular member formed to practically encircle the said central mandrel without departing from the spirit of the invention or the scope of the claims.

Having described the invention, what I claim as new and desire to secure by Letters Patent is:

1. In combination, in a device for constructing a laminated, cohering and interwound fabric band, a central mandrel, tubular mandrels exterior to said central mandrel for guiding adhesive bands to the exterior sides of said central mandrel, means for winding series of spaced fibrous elements upon the central mandrel, means for winding similar series of fibrous elements upon said exterior mandrels, concentric with said first-named series, and means for pulling the tubular band thus formed from the mandrel, said means serving also to lay said adhesive bands longitudinally upon said first wound series, and interposed between said first wound and last wound series of fibrous elements.

2. In combination in a device for constructing a laminated, cohering, interwound fabric band, a central mandrel means for winding crossing series of spaced, fibrous elements thereon, a pair of tubular outer mandrels, adjacent to said central mandrel through which bands of solid adhesive can pass, means for winding series of spaced and crossed fibrous elements upon said outer mandrels concentric with the said first wound series, and means for drawing the concentric series of fibrous elements and interposed bands of solid adhesive from said mandrel.

3. In means for interposing adhesive bands between series of interwound fibrous elements in a fabric band, a central mandrel, means for winding crossing series of spaced fibrous elements thereon, outer tubular mandrels through which solid bands of adhesive material are guided to the central mandrel, said outer mandrels being closely adjacent thereto, the extremities of said outer mandrels being bent about said central mandrel, means for winding similar series of spaced fibrous elements upon said outer mandrels, concentric with said first wound series, and means for drawing all said series and interposed bands of adhesive from all said mandrels, said drawing means serving as a flattening means therefor.

4. In a device for constructing a laminated, cohering, interwound fabric band, and for incorporating a mass of adhesive therein, in combination, inner and outer mandrels, means for winding crossing series of parallel spaced fibrous elements thereon, means for eliminating moisture from said fibrous elements, a coating chamber, the centers of said mandrels within the coating chamber lying on a straight line transversely of the coating chamber, means upon one of said mandrels for separating said fibrous elements in said coating chamber to give access for the coating material to them, said outer mandrels being hollow to permit the passage of bands of solid adhesive therethrough, and between the series of fibrous elements, and means for drawing the band from the mandrel.

5. In a device for introducing bands of solid adhesive between the series of fibrous bands, in a laminated, interwound fabric band, a central mandrel, means for winding series of parallel, spaced, crossing fibrous bands upon the mandrel, hollow outer mandrels extended parallel with said central mandrel for the passage of bands of adhesive material, means for winding a second series of parallel spaced crossing fibrous bands upon said outer mandrels and concentric with said first wound series, the extremities of said outer mandrels being curved to apply said bands of adhesive about the edges of said fabric band.

6. In a device for constructing a laminated, cohering, interwound fabric band, and for incorporating a mass of adhesive therein, in combination, means for interwinding a plurality of series of parallel, spaced, crossing fibrous elements in separate layers, means for coating the separate fibers of said elements with liquid adhesive, and means for introducing adhesive material in solid form between the layers of fibrous elements.

7. In a device for constructing a laminated, cohering, interwound fabric band, and for incorporating a mass of adhesive therein, in combination, means for interwinding a plurality of series of parallel, spaced fibrous elements to form a band, means for coating the separate fibers of said fibrous elements with liquid adhesive, and means for introducing a layer of solid adhesive material at the center of said band.

8. In a device for constructing a laminated, cohering, interwound fabric band, and for incorporating a mass of adhesive therein, in combination, means for interwinding a plurality of series of parallel, spaced, fibrous elements to form a band having a plurality of layers, means for introducing a layer of solid adhesive material at the center of said band, and means for introducing a layer of solid adhesive between the layers of fibrous elements.

9. In a device for constructing a laminated, cohering, interwound fabric band, and for incorporating adhesive therein, in combination, inner and outer mandrels, means for winding crossing series of parallel, spaced, fibrous elements on said mandrels, a coating chamber surrounding a portion of said mandrels, means for drawing the band along the mandrels through said coating chamber, and off of the mandrels, and means whereby the fibers of the elements are separated in passing through said coating chamber to permit the thorough coating of the same.

10. In a device for constructing a laminated, cohering, interwound fabric band, and for incorporating adhesive therein, in combination, a mandrel structure comprising three hollow individual mandrels, each of said mandrels having a flattened cross section, the individual mandrels being arranged side by side and having substantially the same width throughout the majority of their length.

11. In a device for constructing a laminated, cohering, interwound fabric band, and for incorporating adhesive therein, a flattened hollow mandrel, and lateral projections carried by said mandrel at one portion thereof, said projections being separated from the body of the mandrel for a portion of their length.

12. In a device for constructing a laminated, cohering, interwound fabric band, and for incorporating adhesive therein, a mandrel structure comprising three flattened hollow mandrels arranged side by side, a coating chamber surrounding a portion of said structure, and lateral projections carried by the central one of said mandrels within said chamber, said projections being separated from the central mandrel for a portion of their length.

In testimony whereof, I hereunto set my hand this twenty-fourth day of July, 1914.

LAWRENCE A. SUBERS.

In presence of—
ERNEST MOSMAN,
ADAM MEYER.